United States Patent Office 3,310,404
Patented Mar. 21, 1967

3,310,404
OFFSET MASTER PREPARATION AND
ELEMENTS
Frederick O. Bach, Elmhurst, Ill., assignor to A. B. Dick
Company, Niles, Ill., a corporation of Illinois
Filed Feb. 18, 1963, Ser. No. 258,997
19 Claims. (Cl. 96—33)

This invention relates to a new and improved method for the production of an imaged lithographic master indirectly from an original and to elements for use in the practice of same and it relates more particularly to a new and improved negative and the method of use of the negative for imaging a lithographic plate by radiation technique.

It is an object of this invention to provide a new and improved technique in the preparation of an imaged lithographic master and it is a related object to provide a method and means for the imaging of a lithographic plate by radiation of a prepared negative and it is a further object of this invention to provide a new and improved negative for use in the described process and to provide a method for the preparation of same.

More specifically, it is an object of this invention to produce an imaged negative by radiation of an original and with the portions to be reproduced in the original containing radiation-absorbing heat or radiation-generating material transmitted to the negative to define the imaged portion thereof; in which the negative contains a material which is responsive to the pattern transmitted from the radiated original to permit the transmission of ultra-violet or other rays while blocking transmission from the remainder; in which a photolithographic master can be imaged by use of the prepared negative by photographic techniques, and it is a related object to produce and to provide a method and means of the type described which can be employed with low cost and readily available materials, which are simple in manufacture and use; which are effective to produce copy of good quality and which are adapted for use in producing an imaged lithographic, spirit or mimeograph master.

These and other objects and advantages of this invention will hereinafter appear and for purposes of illustration, but not of limitation, an embodiment of the invention is shown in the accompanying drawing in which.

Figure 1:
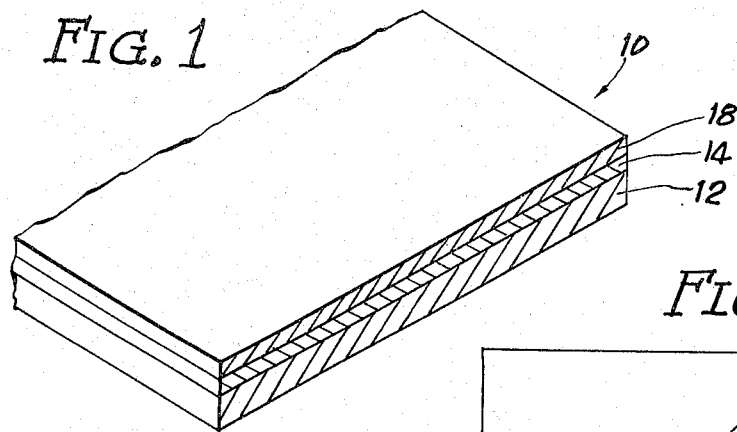
FIG. 1 is a perspective view in section of a negative sheet embodying the features of this invention.
Figure 2:
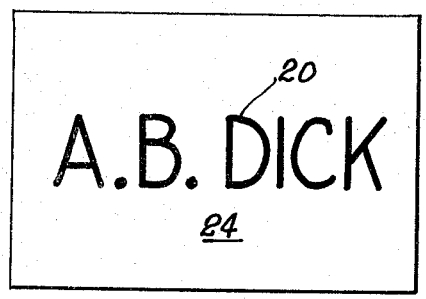
FIG. 2 is a view similar to that of FIG. 1 showing the negative after it is exposed to the original.

Briefly described, in the practice of this invention use is made of a negative 10 formed of a base sheet 12 and a surface which is either water wettable or made water wettable by a suitable treatment or coating 14 in which the water wettable surface is overcoated with a continuous coating 18 formulated of a water soluble or water dispersible matrix which contains, as a dispersed phase, a material which is hydrophobic and oleaginous and responds to heat whereby heated portions of the coating become resistant to removal by aqueous media. The composite negative sheet 10 is fabricated to be relatively transparent to radiations of short wave length, such as infrared and particularly ultra-violet.

In development of the negative, the latter is positioned adjacent an original containing radiation-absorbing material in the imaged portions which, in response to the absorption of such radiations, either generate a heat pattern which is transmitted to the negative or else regenerate a pattern of radiations of higher wave length which are absorbable by the negative and converted into heat.

Upon radiation of the assembly with the coated side of the negative adjacent to or on the side away from the original in surface contact with the negative, radiations pass through the coated negative onto the original. The radiations striking the radiation-absorbing material forming the image in the original are absorbed and converted into heat or into radiations of longer wave length in a pattern corresponding to the original. The pattern is transmitted back to the negative whereby the corresponding areas of the overcoating 18 are heated sufficiently to cause fusion of the oleaginous hydrophobic material dispersed in the water soluble or water dispersible matrix forming the continuous phase. Thereafter, the exposed negative is treated with a solution in which the material making up the continuous phase of the overcoating is either soluble or dispersible to effect removal of the overcoating in the unexposed areas thereby to expose the underlying water wettable surface 14 while the coating remains in the exposed areas to prevent wetting of the water wettable surface and to define the image 20 in the exposed negative.

The negative is subsequently developed by treatment of the surface with a wash coat which contains a material effective to block the transmission of ultra-violet whereby the latter is received by the water wettable, non-imaged portions 22 of the exposed negative to produce a developed negative which can be used in the preparation of an imaged master by the radiation techniques hereinafter described. The developing solution described can be applied as a separate wash coat but instead the material blocking the transmission of ultra-violet may be incorporated into the solution or liquid medium employed to remove the unexposed portions of the coating 18 in the non-imaged areas.

The following will illustrate the practice of this invention in the preparation of an imaged lithographic master:

PREPARATION OF THE NEGATIVE SHEET

*Water wettable surface*

A sheet of cellulose triacetate 12 is made water wettable on one surface by coating the surface of the cellulose triacetate sheet with the following composition to provide a water wettable subbing layer 14:

MIXTURE A

| | | |
|---|---|---|
| Talc | grams | 800 |
| Colloidal silica (Ludox HS) | ml | 1000 |
| Clay (Huber's Hydrafine) | grams | 200 |
| Expanded perlite (Ryolex #4) | do | 50 |

MIXTURE B

| | Ml. |
|---|---|
| Sodium silicate (N brand) | 50 |
| Colloidal silica (Ludox HS) | 1000 |
| Gum in 25% solution (Penford gum) | 300 |
| An acrylic modified vinylidene chloride (Rhoplex R-9) | 400 |

The materials of mixture A and the materials of mixture B are separately combined and then the mixtures A and B are dispersed one in the other with rapid agitation for about 4 minutes.

The combined composition is coated onto the film of cellulose triacetate (2 mil. thickness) in coating weights of about four to six pounds per 3000 square feet and thereafter the coating is allowed to air dry or dry at slightly elevated temperatures up to about 200° F.

In the above formulation, the Hydrafine clay can be substituted in whole or in part by other clays, such as Columbia clay. The acrylic acid modified polyvinylidene chloride resin can be substituted with an emulsion of vinylidene chloride (Daran 202 of Dewey & Almy Chemical Company), or other easily dispersible polymer.

The foregoing preparation is given only by way of example to provide a suitable base with a water wettable surface in the form of a subbing layer 14. It will be understood that other water wettable subbing layers can be employed on the cellulose triacetate or on another suitable base which is characterized by water insolubility and substantial transparency to ultra-violet or infra-red radiations. Instead, use can be made of a base material which is in itself characterized by a surface which is highly water wettable and thereby eliminate the necessity for the separate application of a subbing layer 14.

Thermolith layer

The negative formed of a base and the water receptive, water wettable surface in the form of the applied subbing layer 14 is subsequently provided with a continuous layer 18, hereinafter referred to as a thermolith layer in the form of an overcoating on the subbing layer which may have the following composition:

| | | |
|---|---|---|
| Cane wax | grams | 600 |
| Partially hydrolyzed polyvinyl acetate | do | 94 |
| Ethanol | do | 430 |
| Water | ml | 2200 |
| Dyestuff (du Pont Latyl Violet) | grams | 6 |
| Dyestuff (Calcophen Yellow) | do | 3 |

The composition formed by the mixture above is applied by roller coating, spray coating or the like onto the surface of the subbing layer in coating weights of one-half to two pounds per 3000 square feet and then dried.

When the formed negative is thereafter positioned adjacent the original, and preferably in contact therewith, and the original is radiated with radiations rich in infra-red, the radiations absorbed by the original are either converted into heat to form a heat pattern which transfers to the negative in surface contact therewith, or else the infra-red radiations which penetrate the negative but are absorbed by the image in the original are converted into wave lengths of greater length which are no longer capable of penetration of the negative but instead are absorbed to form the corresponding heat pattern. Whichever way the heat pattern is formed, the heat is sufficient to cause fusion of the wax in the heated areas of the thermolith layer 18 corresponding the original. The dyestuffs present in the thermolith layer are put into solution into the molten wax to bring about a color change whereby the image 20 formed in the fused portions of the negative become readable. In the absence of the desire to form a readable negative, the dyestuffs can be omitted as a component in the thermolith layer.

It will be understood that the foregoing formulation of the thermolith layer is given solely by way of illustration, but not by way of limitation. It will be understood further that the formed negative can be positioned with the thermolith layer adjacent the original or positioned in the direction away therefrom and that radiations of the original may be effected by direction through the negative sheet onto the positive or by radiation of the positive directly without penetration through the negative.

Fusion of the wax in the thermolith layer 18 renders the imaged portion 20 incapable of being dissolved or dispersed by aqueous medium. As a result, when in subsequent development the exposed negative is washed with aqueous medium, the portions of the thermolith layer containing the unfused wax, corresponding to the non-imaged portions 24, are removed by the aqueous medium to expose the underlying water wettable surface 14 while the non-wettable portion of the thermolith layer corresponding to the imaged portion 20 of the thermolith layer and containing the fused wax remains to cover the water wettable surface in the imaged areas corresponding to the original.

Thereafter the developed negative is wetted with an aqueous medium containing a component which is an absorbent or otherwise is a barrier to the penetration of ultra-violet or other short rays whereby the blocking agent is received by the water wettable, non-imaged portion 24 of the negative and repelled by the wax coated imaged portions to coat only the non-imaged portions with the blocking agent 26. As the blocking agent, use can be made of a 5% by weight water solution of metanil yellow. It will be understood that other concentrations and other water soluble or water dispersible ultra-violet absorbents or blocking agents can be employed.

Instead of treating the exposed negative with the water solution of metanil yellow after development of the plate to remove the thermolith coating in the non-imaged areas, the application of the blocking agent and the final development of the plate by the removal of the thermolith layer in the non-imaged portions can be effected in one and the same operation by the incorporation of the metanil yellow or other ultra-violet absorbent or blocking agent in the desired concentration as a component of the aqueous solution with which the exposed negative is treated for removal of the thermolith layer in the non-imaged areas for development.

Figure 3:
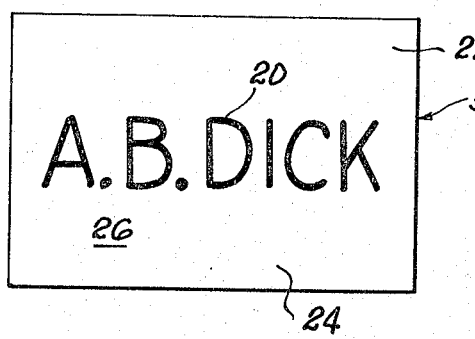
FIG. 3 is a view similar to those of FIGS. 1 and 2 showing the developed negative after exposure.
Figure 4:
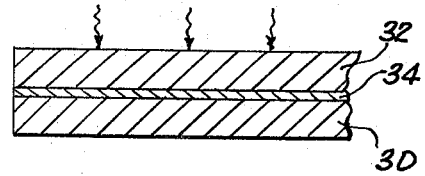
FIG. 4 is a sectional elevational view showing the arrangement of elements for imaging a master with the developed negative.
Figure 5:
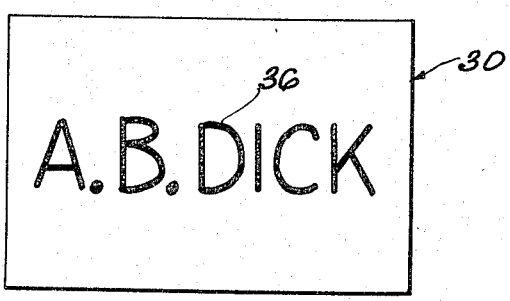
FIG. 5 is a perspective view partially in section of the imaged lithographic plate.

The resultant negative, illustrated in FIG. 3, is now ready for use in the imaging of a photolithographic plate 30 of the type having a lithographic surface coated with a material which forms an ink receptive, water repellent imaging material in response to exposure to light, as represented by an aluminum lithographic plate sensitized with a resin-forming, light-sensitive diazo compound of the type described in the Jewett et al. Patent No. 2,714,066.

Plate development

The formed negative 32 of FIG. 3 is positioned over the presensitized surface 34 of the lithographic plate 30 and radiations (arrows) rich in ultra-violet are addressed from a suitable source onto the negative. Penetration of the radiations through the non-imaged portions of the negative is blocked by the metanil yellow or other ultra-violet absorbent or blocking agent present as a continuous coating on the non-imaged portions of the negative while the radiations are free to penetrate through the imaged portions of the negative to strike the presensitized surface of the plate whereby the diazo resin-forming materials in the exposed portions of the presensitized coating are converted to the ink receptive, water repellent material to form an ink receptive image 36 on the lithographic surface of the plate 30 which image will correspond exactly to the original. Upon separation of the negative from the imaged lithographic plate and after washing the plate to remove the undeveloped water soluble diazo compounds in the non-imaged portions of the plate, the imaged photolithographic plate is ready for use in the production of copies by conventional lithographic techniques.

The formed negative remains usable again and again for imaging presensitized lithographic plates with the result that more than one imaged plate can be secured from a single negative.

The foregoing compositions are given by way of illustration of the concepts of the invention as practiced to produce an imaged photolithographic plate from an original.

It will be apparent that various other formulations and materials may be adapted to the concepts described without departing from the spirit of the invention. For example, the subbing layer 14 may be dispensed within its entirety when the base sheet 12, which is transparent to infra-red and ultra-violet, is characterized by a surface which is highly water wettable or is rendered water wettable by surface treatment. Similarly, other water soluble or water dispersible compositions can be employed as the thermolith layer with the provision that the applied thermolith layer be characterized by transparency to ultra-violet and infra-red and change in response to heat whereby the heated portions become resistant to removal by an aqueous wash so that the heated or fused portions remain to cover the underlying water wettable surface and prevent such imaged portions from being coated with the ultra-violet blocking agent carried in aqueous medium.

It will be understood that other changes may be made in the details of construction, arrangement and operation without departing from the spirit of the invention, especially as defined in the following claims.

I claim:

1. The method of producing an imaged offset master from an original which defines infra-red absorbing and heat generating image areas comprising the steps of positioning the original in surface contact with a negative sheet which is substantially transparent to ultra-violet and infra-red radiations and which has a substantially hydrophilic surface with a water removable coating containing a substance which is converted into a water repellent portion in response to heat, exposing the original to radiations rich in infra-red whereby the heat pattern generated in said image areas in response to the radiation of the original converts portions of the negative coating corresponding to said image areas to the water repellent phase, washing the exposed negative with an aqueous medium to remove the coating from the non-imaged portions of the negative and expose the underlying substantially hydrophilic surface, treating the negative with an aqueous system containing a barrier to ultra-violet whereby said ultra-violet barrier substance is retained by the substantially hydrophilic non-imaged portions of the negative and repelled by the water repellent imaged portions of the negative, bringing the developed negative into face to face relationship with the offset surface of an offset plate having a coating containing a material which is converted to an ink receptive, water repellent imaging material responsive to exposure to ultra-violet, directing radiations rich in ultra-violet onto the developed negative whereby the ultra-violet blocking agent in the non-imaged portions of the negative prevents passage of sufficient amounts of ultra-violet therethrough for reaction of corresponding portions of the coating on the offset plate while sufficient of the ultra-violet radiation pass through the imaged portions of the negative for reaction to convert the corresponding portions of the coating on the offset plate to a water repellent, ink receptive image corresponding to the original.

2. The method as claimed in claim 1 in which the negative comprises a base sheet having a hydrophilic surface onto which the heat responsive coating is applied.

3. The method as claimed in claim 1 in which the negative is a base sheet having a subbing coating between the surface of the base sheet and the heat responsive coating in which the subbing coating is a substantially hydrophilic coating.

4. The method as claimed in claim 1 in which the heat responsive coating contains the water repellent substance as a dispersed phase in a continuous phase of a water soluble material.

5. The method as claimed in claim 1 in which the heat responsive coating contains the water repellent substance as a dispersed phase in a continuous phase of a water dispersible material.

6. The method as claimed in claim 1 in which the washing step and the treating step are combined and in which the wash solution that is used to remove the heat responsive coating in the non-imaged portions of the negative contains the ultra-violet substance.

7. The method as claimed in claim 1 in which the ultra-violet barrier substance comprises metanil yellow.

8. The method as claimed in claim 1 in which the ultra-violet sensitive material on the offset plate comprises a light sensitive resin forming diazo compound.

9. The method as claimed in claim 1 which includes the step of separating the original from the negative after infra-red radiation.

10. The method as claimed in claim 1 which includes the step of separating the negative from the imaged offset plate after ultra-violet radiation.

11. A sheet for use in the preparation of an imaged offset master from an original comprising a base sheet which is substantially transparent to ultra-violet and infra-red, a subbing coating on the surface of the base sheet which is water insoluble but substantially hydrophilic and which is also substantially transparent to ultra-violet and infra-red, and a heat sensitive coating on the subbing layer which is removable by aqueous medium and which contains a substance which converts the coating to a water repellent coating in response to heat and in which the coating is also transparent to ultra-violet and infra-red.

12. A sheet as claimed in claim 11 in which the coating contains the water repellent substance as a dispersed phase in a continuous phase of a water soluble material.

13. A sheet as claimed in claim 11 in which the coating contains the water repellent substance as a dispersed phase in a continuous phase of a water dispersible material.

14. A developed sheet embodying an ultra-violet-transparent image corresponding to an original and usable in the preparation of an offset master by ultra-violet radiation comprising a base sheet having a substantially hydrophilic surface, a water repellent coating on the portions of the water wettable surface corresponding to the imaged portion, and an ultra-violet blocking agent coating the substantially hydrophilic surface only in the non-imaged portion.

15. The method of producing a developed negative comprising the steps of positioning an original in surface contact with a negative sheet which is substantially transparent to ultra-violet and infra-red radiations and which has a substantial hydrophilic surface with a water removable coating containing a substance which is converted into a water repellent portion in response to heat, exposing the original to radiations rich in infra-red whereby the heat pattern generated in response to the radiation of the original converts the corresponding portions of the negative coating to the water repellent phase which corresponds to the image of the original, washing the exposed negative with an aqueous medium to remove the coating from the non-imaged portions of the negative and expose the underlying substantially hydrophilic surface, treating the negative with an aqueous system containing a barrier to ultra-violet whereby said ultra-violet barrier substance is retained by the substantially hydrophilic non-imaged portions of the negative and repelled by the water repellent imaged portions of the negative.

16. The method as claimed in claim 15 in which the heat responsive coating contains the water repellent substance as a dispersed phase in a continuous phase of a water soluble material.

17. The method as claimed in claim 15 in which the heat responsive coating contains the water repellent substances as a dispersed phase in a continuous phase of a water dispersible material.

18. The method as claimed in claim 15 in which the washing step and the treating step are combined and in which the washing solution used to remove the heat responsive coating in the non-imaged portion of the negative also contains the ultra-violet barrier substance.

19. A developed sheet embodying an image corresponding to an original comprising a base sheet having a substantially hydrophilic surface, a water repellent ultra-violet-transparent coating on the portions of the water wettable surface corresponding to the imaged portion, and a ultra-violet blocking agent coating the substantially hydrophilic surface only in the non-imaged portion.

(References on following page)

References Cited by the Examiner

UNITED STATES PATENTS

| | | | |
|---|---|---|---|
| 2,317,789 | 4/1943 | Marriott | 117—36.7 |
| 2,714,066 | 7/1955 | Jewitt et al. | 96—86 |
| 2,837,430 | 6/1958 | Goldberg | 96—36 |
| 2,875,051 | 2/1959 | De Maria | 96—35 |
| 2,950,987 | 8/1960 | Howard | 250—65.1 |
| 2,970,534 | 2/1961 | Marron | 117—36.7 |
| 3,050,502 | 4/1962 | Mellan | 96—33 |
| 3,057,999 | 10/1962 | Newman et al. | 117—36.7 |
| 3,067,349 | 12/1962 | Kasperowicz et al. | 96—35 |
| 3,070,428 | 12/1962 | Cohen | 96—35 |
| 3,083,132 | 3/1963 | Miehle | 250—65.1 |
| 3,100,702 | 8/1963 | Rauner et al. | 96—33 |

NORMAN G. TORCHIN, *Primary Examiner.*

A. D. RICCI, R. H. SMITH, *Assistant Examiners.*